(12) United States Patent
Saunders

(10) Patent No.: US 6,175,940 B1
(45) Date of Patent: Jan. 16, 2001

(54) IN-FLIGHT PROGRAMMABLE SPACECRAFT ERROR CORRECTION ENCODER

(75) Inventor: Oliver W. Saunders, Los Angeles, CA (US)

(73) Assignee: TRW Inc., Redondo Beach, CA (US)

( * ) Notice: Under 35 U.S.C. 154(b), the term of this patent shall be extended for 0 days.

(21) Appl. No.: 09/204,777

(22) Filed: Dec. 3, 1998

(51) Int. Cl.[7] ...................................................... G06F 11/00
(52) U.S. Cl. ............................................ 714/746; 714/755
(58) Field of Search .................................... 714/746, 755

(56) References Cited

U.S. PATENT DOCUMENTS 5,278,906 * 1/1994 Boly et al. .............................. 380/48
5,365,530 * 11/1994 Yoshida ................................. 714/755

* cited by examiner

Primary Examiner—Phung M. Chung
(74) Attorney, Agent, or Firm—Michael S. Yatsko

(57) ABSTRACT

An error correction encoding system (20) is provided for use in an in-flight programmable spacecraft. The error correction encoding system (20) includes a first data routing switch (22) which receives an uncoded data stream and directs the uncoded data stream to either of a first encoding device (26) or a second encoding device (24). The first encoding device (26) receives the uncoded data stream from the first data routing switch (22) and applies a first encoding function. Alternatively, the second encoding device (24), having a plurality of programmable logic blocks, receives the uncoded data stream from the first data routing switch (22) and applies a second encoding function. A controller (30) is connected to the second encoding device (24) for configuring the plurality of programmable logic blocks to perform the second encoding function. Lastly, a second data routing switch (22) receives a coded data stream from either of the first encoding device (26) or the second encoding device (24) and outputs a coded data stream.

15 Claims, 6 Drawing Sheets

IN-FLIGHT PROGRAMMABLE SPACECRAFT ERROR CORRECTION ENCODER

BACKGROUND OF THE INVENTION

1. Field of the Invention

This invention relates generally to satellite communication systems and, more particularly, to an error correction encoding system for use in an in-flight programmable spacecraft.

2. Discussion of the Related Art

Modern spacecraft routinely exhibit useful lifetimes in excess of ten years. This extended operating life poses a problem for the designers of satellites which transmit digital data that either originated on board or is being retransmitted after on-board demodulation. Rapid advances in coding theory and applicable technology has revolutionized satellite transmission and comparable advances are anticipated in the future. However, once the spacecraft is launched, the downlink encoding scheme cannot be changed.

Today, an on-board computer may be used to perform encoding aboard some spacecraft. Although a software-based encoder might be used for certain types of encoding, it would require a processor architecture that was optimized with respect to both the logic operations associated with encoding and the spacecraft's operational environment (especially temperature and radiation). In other words, the computer-based approach is not suited to high speed data transmission because of processing speed limitations and power penalties imposed by the execution of software instructions and the processor's input/output structure.

Therefore, it is desirable to provide a technique which allows the satellite designers and operators to exploit improved coding techniques for high speed data transmission and reductions in ground terminal decoding costs that may occur after launch. In particular, the present invention permits the satellite designers and operators to change the downlink encoding scheme after the spacecraft had been launched. This enables the future use of coding schemes whose decoding at the receiving terminal was considered impractical at the time of launch, coding schemes that were not developed until after the satellite had been launched or, if it is determined that operating conditions permit, coding schemes simpler than originally deployed.

Over the lifetime of the satellite, the processor costs (i.e., MIPS/dollar) will continue to diminish. As these costs fall, computationally intensive decoding algorithms that initially could not be implemented in an acceptable form will become more attractive. The system designers will then be able to exploit future coding performance improvements in several ways, including: (1) improve overall system availability (i.e., the percentage of time at which the downlink performs at or below a specified bit error rate), (2) increase average throughput by reducing the ratio of coding bits to data bits, and (3) maintain current performance levels while operating terminals with smaller reflectors.

SUMMARY OF THE INVENTION

In accordance with the present invention, an error correction encoding system is provided for use in an in-flight programmable spacecraft. The error correction encoding system includes a first data routing switch that receives an uncoded data stream and directs the uncoded data stream to either a first encoding device or a second encoding device. The first encoding device receives the uncoded data stream from the first data routing switch and applies a first encoding function. Alternatively, the second encoding device, having a plurality of programmable logic blocks, receives the uncoded data stream from the first data routing switch and applies a second encoding function. A controller is connected to the second encoding device for configuring the plurality of programmable logic blocks to perform the second encoding function. Lastly, a second data routing switch receives a coded data stream from either of the first encoding device or the second encoding device and outputs a coded data stream.

BRIEF DESCRIPTION OF THE DRAWINGS

Other objects and advantages of the present invention will be apparent to those skilled in the art upon reading the following detailed description and upon reference to the drawings in which.

DETAILED DESCRIPTION OF THE PREFERRED EMBODIMENTS

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof, and additional fields in which the present invention would be of significant utility.

Figure 1:
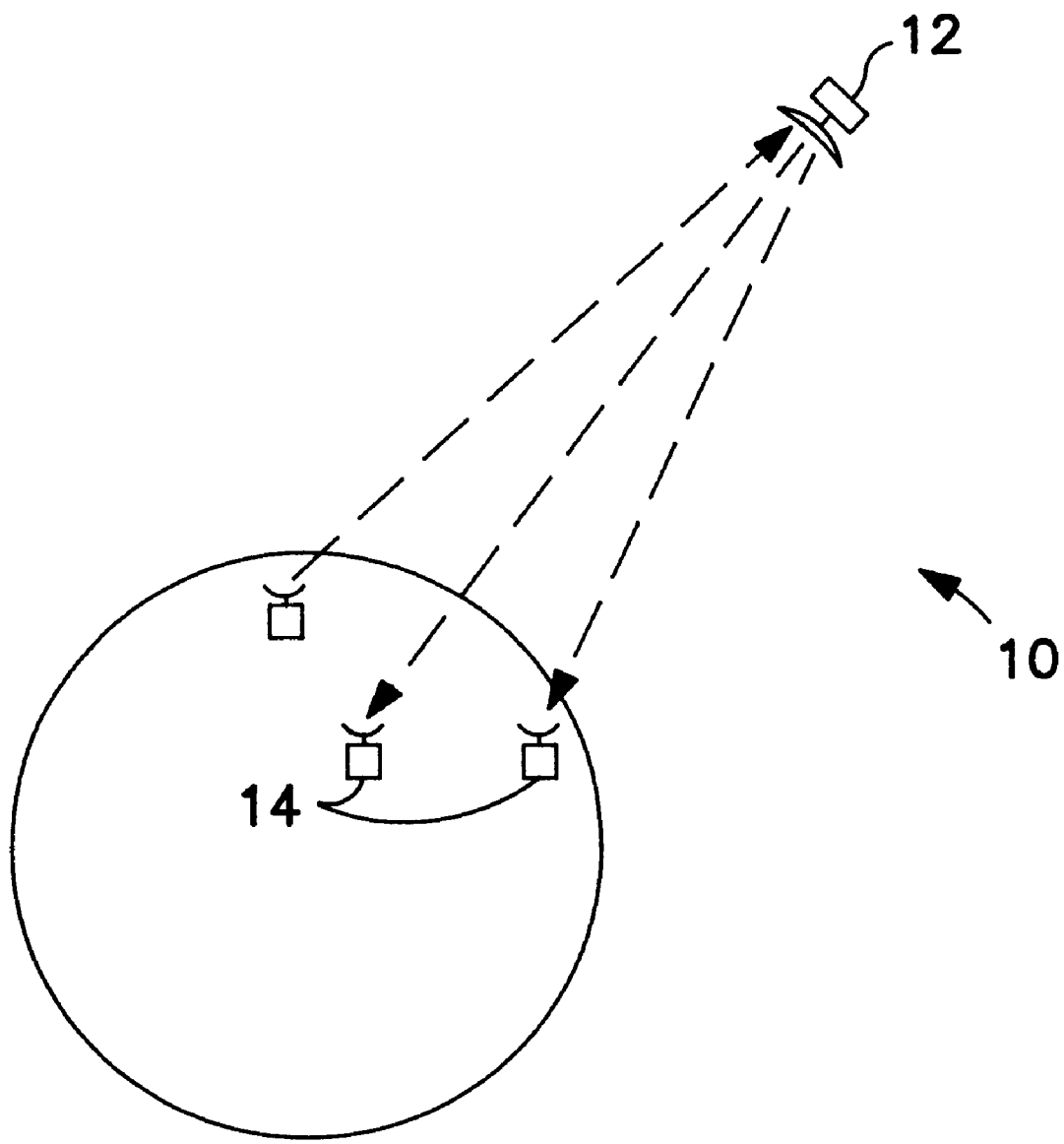
FIG. 1 is a diagram depicting a typical satellite data communication system.

A typical satellite communication system 10 is depicted in FIG. 1. The satellite communication system 10 includes a geosynchronous orbiting satellite 12 which completes a virtual circuit connection between any two of a plurality of ground stations 14. Generally, information is uplinked from a transmitting ground station to the satellite which in turn downlinks the information to a receiving ground station. As will be more fully explained, the present invention is applicable to any satellite or spacecraft that encodes digital data for error correction prior to downlink transmission. In particular, it is applicable to spacecraft that demodulate and then relay digital data (and, hence, do not originate the data being transmitted) as well as various scientific or intelligence gathering spacecraft that originate the information that is transmitted to the ground.

Figure 2:
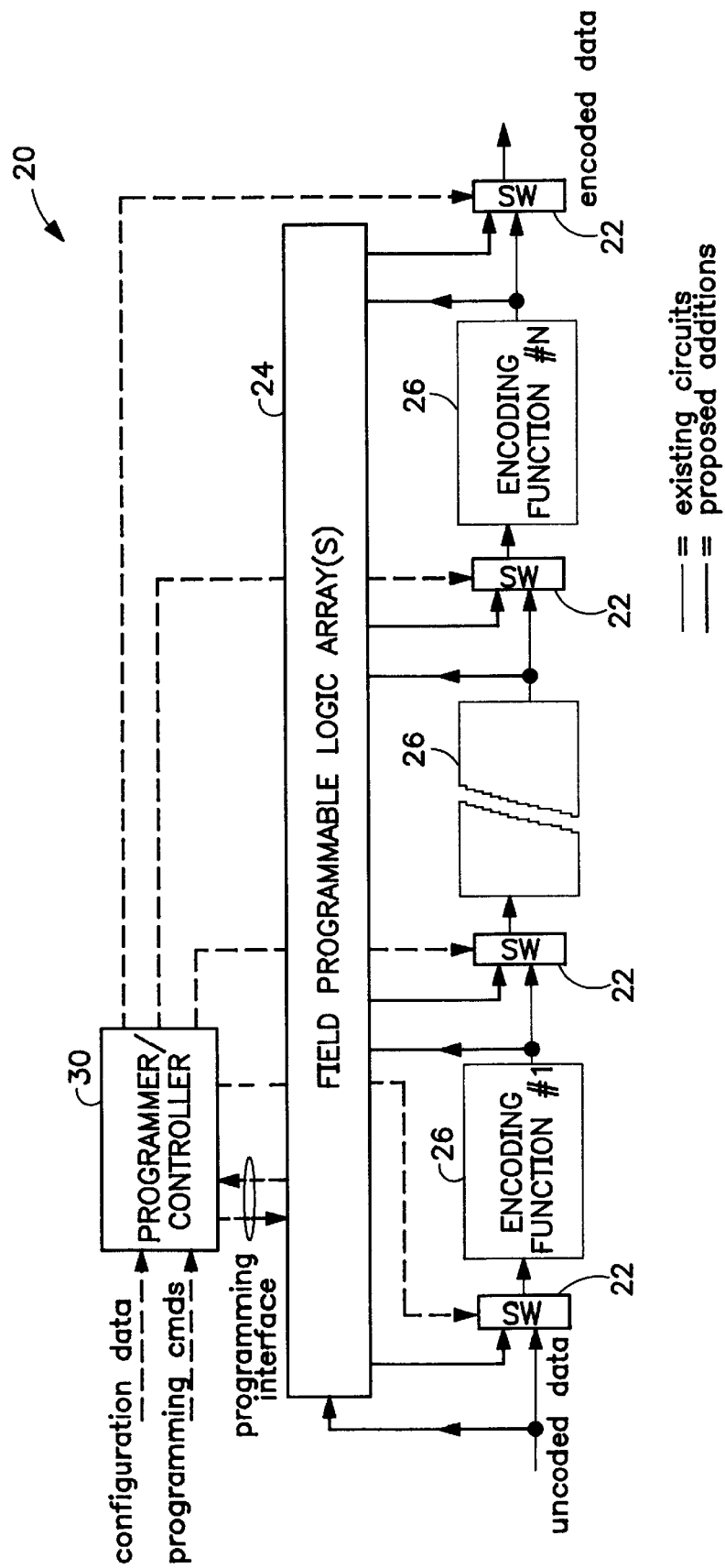
FIG. 2 is a block diagram showing the components of a programmable error correction encoding system of the present invention.

An error correction encoding system 20 for use in an in-flight programmable spacecraft is shown in FIG. 2. In general, an error correction encoding system 20 of the present invention places data routing switches 22 and field programmable gate array (FPGA) devices 24 at appropriate locations in the encoding path so that a default downlink coding scheme (which is implemented in fixed logic) can be replaced in part or entirely by encoding functions transmitted from the ground.

More specifically, a default encoding scheme is implemented in conventional fixed logic as is well known in the art. Prior to downlink transmission, the default encoding scheme typically encodes digital data for error correction. One skilled in the art will readily recognize that one or more commercially available encoding devices 26 may be used to implement the particular encoding functions associated with the default encoding scheme.

Next, a data routing switch 22 is positioned before and after each of the default encoding devices 26. After launch, the plurality of data routing switches 22 control the routing of the data stream (as indicated by the solid lines) through the error correction encoding system 20. Initially, the data stream is routed through the default encoding scheme. However, the plurality of data routing switches 22 can also be used to route the data stream through the FPGA devices 24. In this way, encoding functions from the default encoding scheme can be bypassed as well as supplemented or replaced in part or entirely by encoding functions programmed into the FPGA devices 24. Each data routing switch 22 is implemented in redundant logic so that the default path can be reliably restored if there is a problem with the programmable logic.

The programmable error correction encoding system 20 of the present invention has been made feasible by the development of radiation hardened FPGA devices 24 that can operate reliably in a space radiation environment. These FPGA devices 24 have the property of "in-circuit" programmability which allows them to be programmed after the satellite has been launched. Typically, the complexity of the encoding functions that can be implemented in FPGA devices 24 is limited only by the number of gates provided and the efficiency of the routing algorithms used to define the required interconnections between the gates. Exemplary radiation hardened FPGA devices 24 are manufactured by Space Electronics, Inc. of San Diego, Calif. and Actel Corporation of Sunnyvale Calif.

To implement a new encoding scheme, a programmer/controller 30 receives switch programming commands and programmable logic configuration data from the spacecraft's on-board computer (not shown). As indicated by the dotted lines, the controller 30 then uses the switch commands to place the logic switches 22 into their commanded states and uses the configuration data to implement the reprogramming of the FPGA devices 24.

Figure 3:
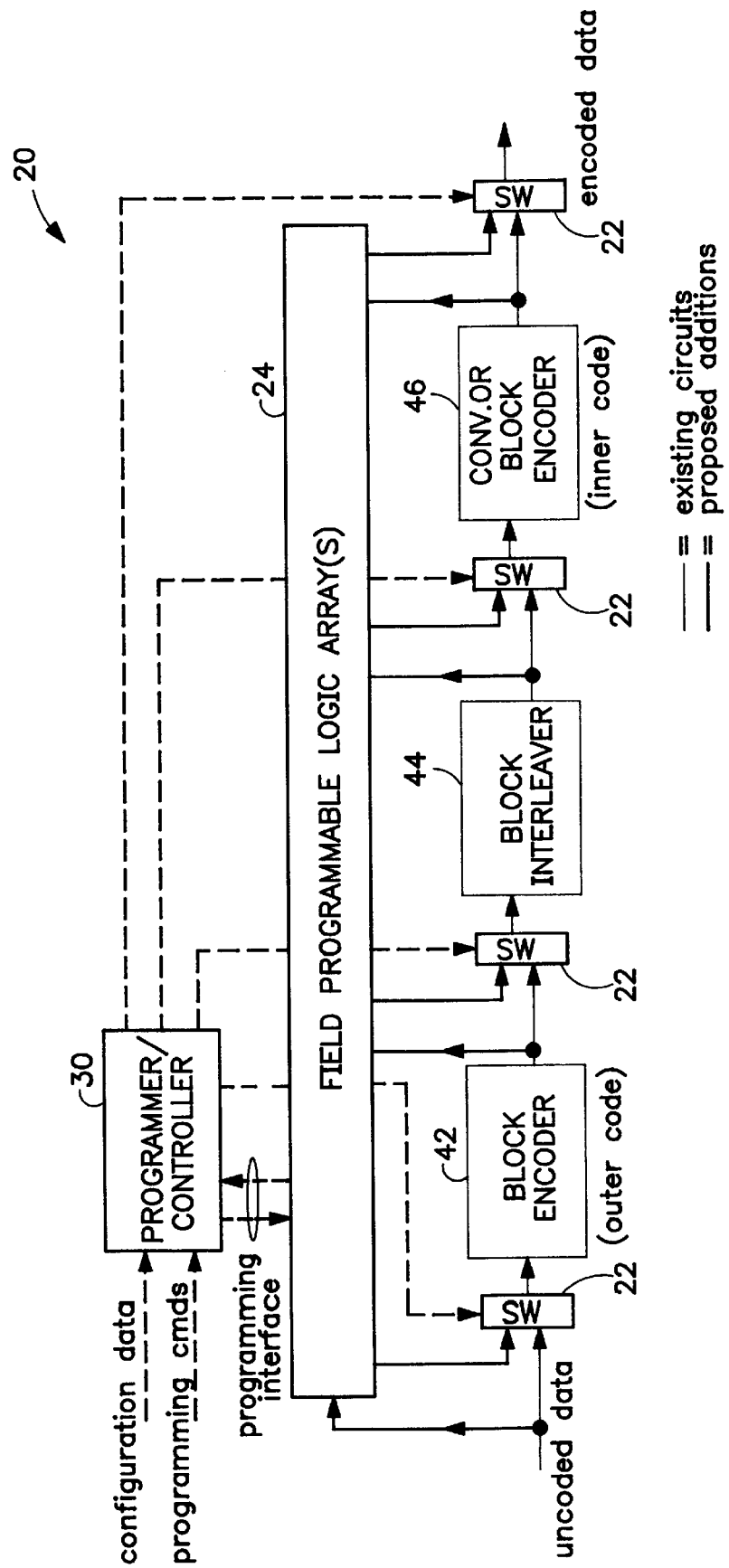
FIG. 3 is a block diagram showing a conventional concatenated coding scheme implemented in the programmable error correction encoding system of the present invention.

FIG. 3 presents the error correction encoding system 20 as applied to a popular concatenated coding scheme. Coding schemes fall into two main categories: block codes and convolutional codes. Decoding schemes for block codes generally use algebraic procedures, based on properties of the code structure, and involve solving sets of algebraic equations. Reed-Solomon codes are the most commonly used block codes. For convolutional codes, the most common decoding scheme is basically a dynamic programming technique referred to as the maximal-likelihood Viterbi algorithm. Concatenated coding is one well known technique for combining the error correcting benefits of block codes with those of convolutional codes. While the following description is provided with reference to a particular concatenated coding scheme, it is readily understood that the explanation is applicable to a variety of different coding schemes.

In FIG. 3, the concatenated coding scheme consists of three distinct functions: a first encoder 42 for applying an "outer code", an interleaver 44 and a second encoder 46 for applying an "inner code". Generally, the outer code is a block code, whereas the inner code is a convolutional code. Short block codes may also be used as the inner code for this type of coding scheme. The interleaver 44 reorders data to provide a better match between the statistics of uncorrected errors left after inner code decoding and the error correction properties of the outer code. This type of concatenated coding scheme is widely used on high quality spacecraft downlinks (e.g., satellite direct-to-home video (DTV) links) that are required to deliver very low bit error rates after decoding.

A typical scenario in which a change might occur after launch involves the discovery of more efficient decoding algorithms for ground terminals that allow a longer constraint length code to be decoded at reasonable cost. In this case, the default convolutional encoder which supports the current industry standard constraint length (i.e., k=7) is programmatically replaced by another convolutional encoder.

Figure 4:
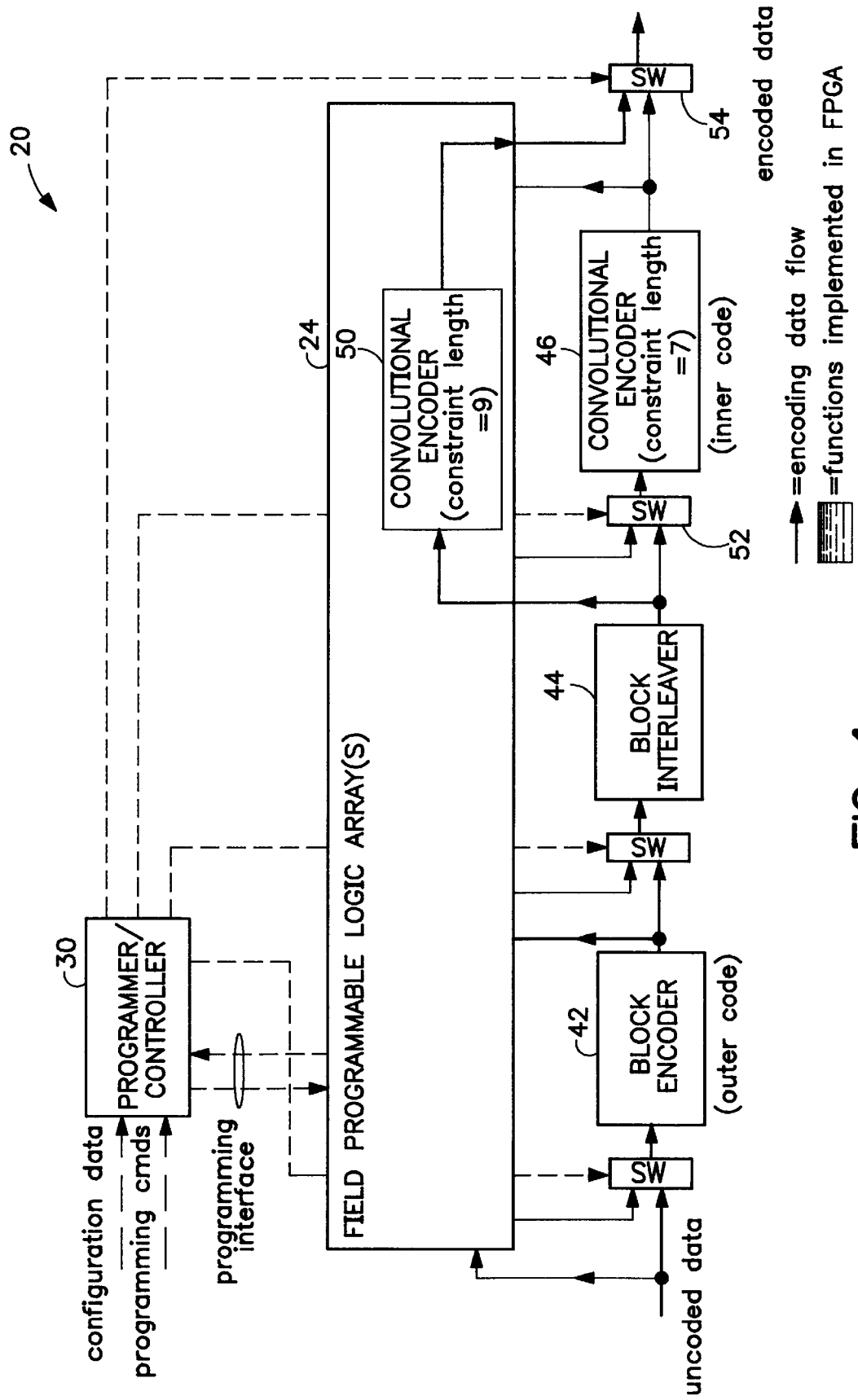
FIG. 4 is a block diagram showing the conventional concatenated coding scheme adapted to employ a longer constraint length convolutional code in accordance with the present invention.

Referring to FIG. 4, a convolutional encoder 50 having a higher constraint length (e.g., k=9) is synthesized in FPGA logic. As previously described, an uncoded data stream passes through the first encoder 42 and the block interleaver 44. The data stream flow is indicated by the bold solid line. At this point, a first data routing switch 52 directs the data stream through the higher complexity convolutional encoder 50 which is imbedded in FPGA device 24. Lastly, a second data routing switch 54 outputs the coded data stream received from the FPGA device 24. The change to the more complex code would significantly improve the performance (i.e., the bit error rate) of the communication link.

Figure 5:
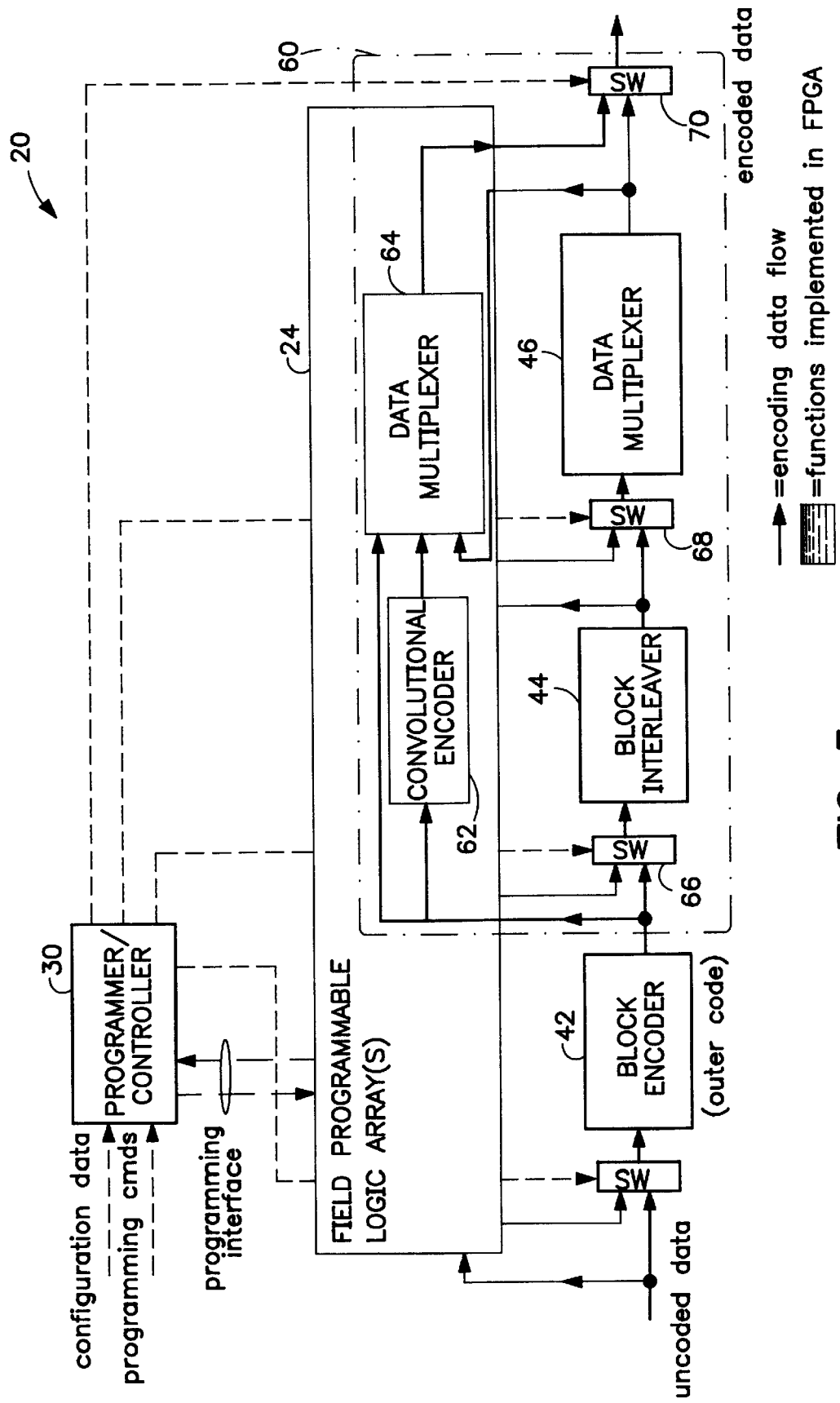
FIG. 5 is a block diagram showing the conventional concatenated coding scheme adapted to employ a parallel form "turbo" coding as the inner code in accordance with the present invention.

FIG. 5 shows a more complex example in which multiple functions synthesized in FPGA logic are integrated with (as opposed to replacing) existing encoding functions. In this case, a turbo code encoder 60 is constructed from a combination of existing and newly synthesized encoding functions. The motivation for making this change is identical to that presented above. That is, at some future time, it will be economically feasible to equip ground terminals with decoders capable of processing these better performing codes. The system operator can programmatically make the changes in the encoding process necessary to exploit the better performing codes.

In particular, the turbo code encoder 60 includes a convolutional encoder 62 and a data multiplexer 64 which are each synthesized in FPGA logic. A first data routing switch 66 routes the data stream from the outer block encoder 42 to the convolutional encoder 62 and to the data multiplexer 64. In parallel, the data stream is routed through the block interleaver 44 and the second convolutional encoder 46. A second data routing switch 68 then directs the output from the second convolutional encoder 46 to the data multiplexer 66. Lastly, a third data routing switch 69 outputs the coded data stream received from the data multiplexer 66.

Figure 6:
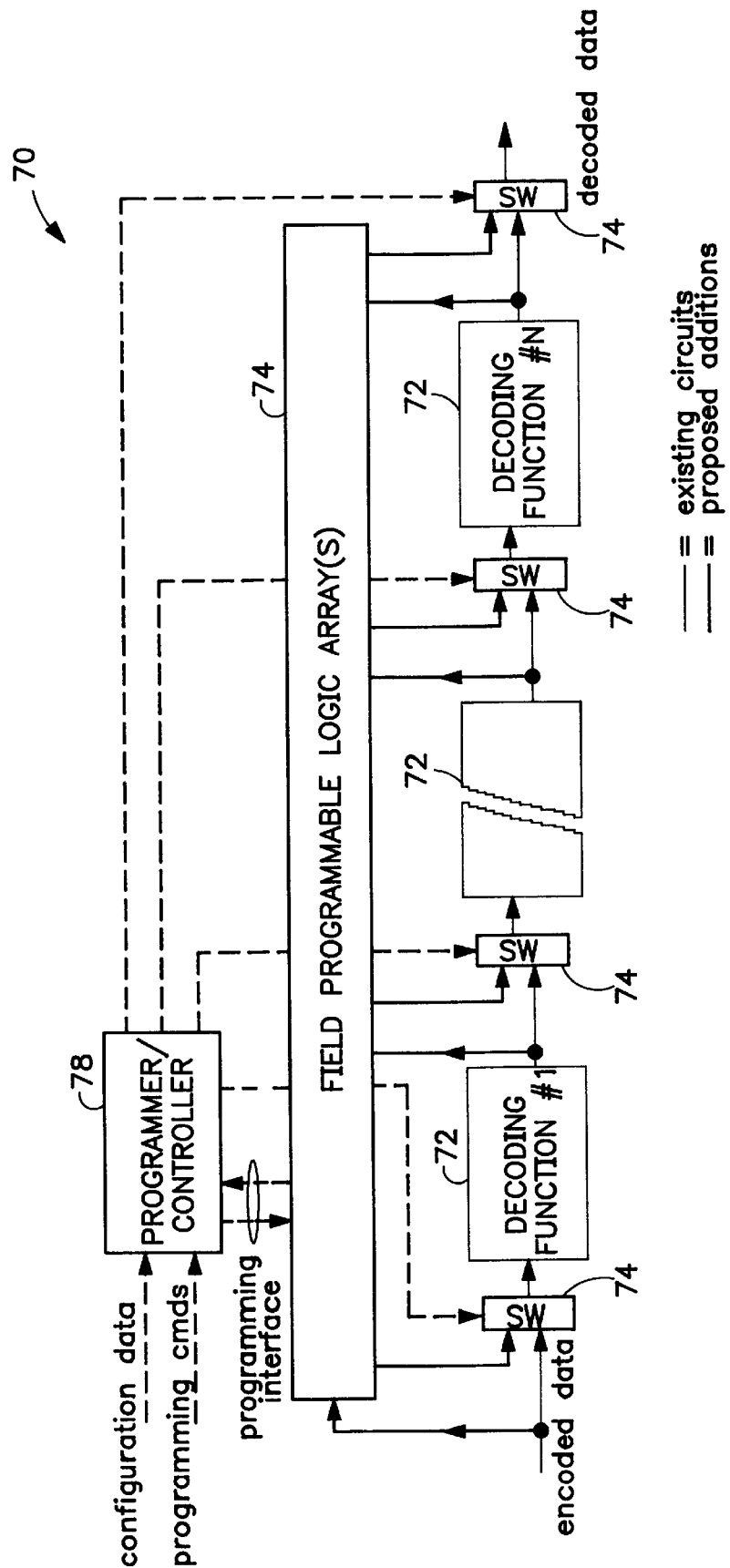
FIG. 6 is a block diagram showing the components of a programmable uplink decoding system in accordance with the present invention.

Although the programmable radiation hardened FPGA devices 24 are particularly applicable to encoding systems, this is not intended as a limitation on the broader aspects of the invention. On the contrary, a programmable uplink decoding system 70 in accordance with the present invention is shown in FIG. 6. The decoding system 70 includes a default decoding scheme implemented using commercially available decoding devices 72, at least one radiation hardened FPGA device 74, and a plurality of data routing switches 76. As previously described, a programmer/controller 78 is used to configure the FPGA devices 74 and the data routing switches 76. The programmable decoding system 70 is particularly suited for spacecraft that demodulate digital data signals.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. An error correction encoding system for use in an in-flight pogrammable spacecraft, comprising:
    a first data routing switch receiving an uncoded data stream and selectively directing said uncoded data stream;
    a first encoding device, said first encoding device being responsive to said uncoded data stream from said first data routing switch and applying a first encoding function to said uncoded data stream;
    a second encoding device, said second encoding device being responsive to receiving said uncoded data stream from said first data routing switch and applying a second encoding function to said uncoded data stream, said second encoding device having a plurality of programmable logic blocks;
    a controller connected to said second encoding device for configuring said plurality of programmable logic blocks to perform said second encoding function; and
    a second data routing switch receiving a coded data stream from one of either said first encoding device or said second encoding device and being operable to output said coded data stream.

2. The error correction encoding system of claim 1 wherein said second encoding device being a radiation hardened field programmable gate array (FPGA) device.

3. The error correction encoding system of claim 1 wherein said controller receiving logic programming commands and being operable to configure said plurality of programmable logic blocks to perform said second encoding function.

4. The error correction encoding system of claim 1 wherein said first data routing switch and said second data routing switch each being logic controlled switches.

5. The error correction encoding system of claim 4 wherein said controller receiving switch programming commands and being operable to command said first data routing switch to direct said uncoded data stream to said second encoding device.

6. The error correction encoding system of claim 5 wherein said controller receiving switch programming commands and being operable to command said second data routing switch to receive said coded data stream from said second encoding device.

7. An error correction encoding system for use in an in-flight programmable spacecraft, comprising:
    a first data routing switch receiving an uncoded data stream and being operable to selectively direct said uncoded data stream to at least one of a first encoding device or a field programmable logic array device;
    said first encoding device receiving said uncoded data stream from said first data routing switch and applying a first encoding function to said uncoded data stream;
    said field programmable gate array (FPGA) device receiving said uncoded data stream from said first data routing switch and applying a second encoding function to said uncoded data stream;
    an FPGA controller connected to said FPGA device for configuring said FPGA device to perform said second encoding function; and
    a second data routing switch receiving a coded data stream from at least one of said first encoding device and said FPGA device and being operable to output said coded data stream.

8. The error correction encoding system of claim 7 wherein said FPGA device being further defined as a radiation hardened FPGA device.

9. The error correction encoding system of claim 7 wherein said FPGA controller receiving logic programming commands and being operable to configure said FPGA device to perform said second encoding function.

10. The error correction encoding system of claim 7 wherein said FPGA controller receiving switch programming commands and being operable to command said first data routing switch to direct said uncoded data stream to said FPGA device.

11. The error correction encoding system of claim 10 wherein said FPGA controller receiving switch programming commands and being operable to command said second data routing switch to receive said coded data stream from said FPGA device.

12. A method for implementing an error correction encoding system on an in-flight programmable spacecraft, comprising the steps of:
    providing a first data routing switch for receiving an uncoded data stream and being operable to selectively direct said uncoded data stream to at least one of a first encoding device and a second encoding device;
    providing said first encoding device for receiving said uncoded data stream from said first data routing switch and applying a first encoding function to said uncoded data stream;
    providing said second encoding device, said second encoding device having a plurality of programmable logic blocks;
    receiving logic configuration data at a controller associated with the in-flight spacecraft, said controller being connected to said second encoding device;
    configuring said plurality of programmable logic blocks to perform a second encoding function using the logic configuration data;
    receiving said uncoded data stream at said second encoding device and applying said second encoding function to said uncoded data stream; and
    providing a second data routing switch for receiving a coded data stream from at least one of said first encoding device and said second encoding device and being operable to output said coded data stream.

13. The method of claim 12 wherein the step of providing a second encoding device includes providing a radiation hardened field programmable gate array (FPGA) device.

14. The method of claim 12 further comprising receiving switch programming commands at said controller and commanding said first data routing switch to direct said uncoded data stream to said second encoding device using the switch programming commands.

15. The method of claim 14 further comprising receiving switch programming commands at said controller and commanding said second data routing switch to receive said coded data stream from said second encoding device.

* * * * *